July 3, 1962 K. LEHOVEC 3,042,565

PREPARATION OF A MOATED MESA AND RELATED SEMICONDUCTING DEVICES

Filed Jan. 2, 1959

*INVENTOR.*
KURT LEHOVEC
BY *Connolly and Hutz*
HIS ATTORNEYS

United States Patent Office 3,042,565
Patented July 3, 1962

3,042,565

PREPARATION OF A MOATED MESA AND RELATED SEMICONDUCTING DEVICES

Kurt Lehovec, Williamstown, Mass., assignor to Sprague Electric Company, North Adams, Mass., a corporation of Massachusetts Filed Jan. 2, 1959, Ser. No. 784,600
2 Claims. (Cl. 156—17)

This invention relates to a method for preparation of a surface configuration of a semiconducting body which can be described briefly as a moated mesa. Furthermore, this invention discloses improved semiconducting devices utilizing the moated mesa configuration.

The mesa configuration is characterized by a flat-topped elevation with steeply sloping walls above a surrounding flat surface. This mesa configuration has been used in semiconducting devices, the mesa containing at least one pn junction which is generally parallel to the surface of the mesa and intersects with the steeply sloping walls of the mesa.

This mesa structure is generally produced as follows. Starting from a semiconducting body with a plane surface, a portion of this surface is provided with a protective coating which is inert to a chemical etch attacking the semiconducting body. Such a coating may be an organic wax, and the chemical etch can be a mixture of hydrofluoric and nitric acid in the case of a germanium body. Immersion of the semiconducting body in the etch leads to the removal of the unprotected surface with a mesa remaining unattacked under the protective coating. Subsequent removal of the protective coating provides the mesa configuration. This well known method of producing a mesa structure is objectionable because it is cumbersome to apply and because of the danger of contaminating the pn junction by traces of the protective material.

It is one object of this invention to describe a method by which a mesa-type structure can be produced in a single step operation and eliminating the danger of contamination.

It is another object of this invention to produce a mesa structure surrounded by a moat.

It is a further object of this invention to provide improved semiconducting devices which arise from the use of a mesa surrounded by a moat.

These and other objects will become clear from the following descriptions and figures.

Figures 1, 2:
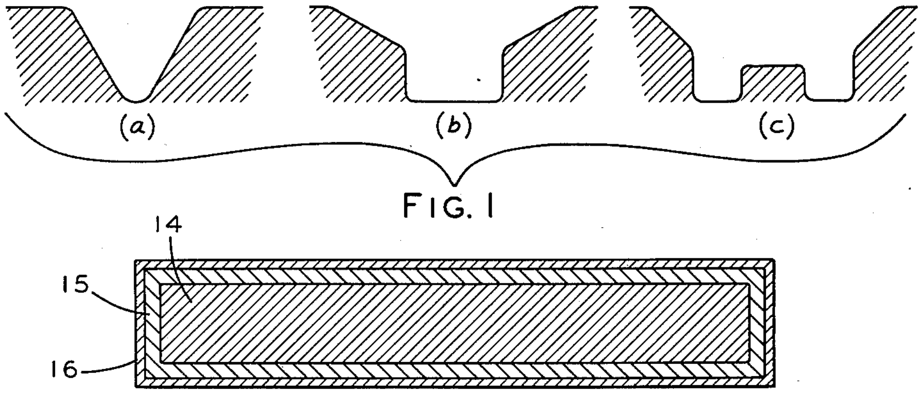
FIGURE 1 shows cross-sections through jet etched indentations in germanium obtained with three increasing current densities, one of the indentations exhibiting the moated mesa of this invention.
FIGURE 2 is a cross-sectional view of a wafer of semiconducting material containing two pn junctions.

The method of producing a mesa according to this invention utilizes an electrochemical jet etch. A jet of an electrolyte impinges on a semiconducting body. For the purpose of the following description, the semiconducting body will be assumed to be germanium. An electrical potential is connected between the jet and the germanium, the germanium being made the positive terminal. If the potential is increased, the current through the jet increases and this has a considerable effect on the shape of the indentation etched into the germanium as illustrated in the FIGURES 1*a*, *b*, and *c*. At small current densities, the indentation is of roughly conical shape changing to a flat bottomed structure shown in FIGURE 1*b* as the current density increases. With further increasing current density, the moated mesa structure of FIGURE 1*c* is obtained. This structure can be produced with the following electrolyte: 10 liters water, 50 milliliters concentrated sulfuric acid, and 20 grams sodium fluoride, at a current of 15 milliamps, a jet of 10 mils diameter, germanium of 1 ohm cm. resistivity, n-type, a flow rate of the electrolyte of 30 milliliters per minute, and an etching time of 2 seconds.

It is believed that the moated mesa configuration is obtained by the combined effect of the hydrodynamic flow pattern in the jet near the germanium surface and the depletion of ions from the jet by the current flow from the jet into the germanium. More specifically, as the jet impinges on the germanium, a stagnant layer of liquid is produced where the axis of the jet meets the surface of the germanium while the electrolyte flows off rapidly near the outside of this layer. The ions are depleted by an electrical current from this stagnant layer and fresh ions are only slowly supplied to this layer because of the stagnant flow pattern. Accordingly, the etching rate under this stagnant layer is quite smaller than that near the periphery of the jet etch where fresh ions are rapidly supplied by the hydrodynamic flow pattern. In view of these considerations, the creation of a moated mesa by electrochemical etching depends on a sufficiently high current drain, and a slow supply of ions to a portion of the germanium surface by the jet; this supply being intimately related to the hydrodynamic flow pattern in the jet.

The preparation of a mesa structure by electrochemical etching as described above offers considerable advantages compared to the preparation of a mesa by the steps of the protective coating, etching and removal of the coating. These advantages are the simplicity of the process and the avoiding of contamination due to the protective coating. However, the preparation of a mesa by electrochemical jet etching offers additional advantages for semiconducting devices which arise from the fact that the electrochemical jet etched mesa is surrounded by a moat ascending towards the outside to the original semiconducting surface. This advantage will be clearer from the following discussion of examples of semiconducting devices utilizing the moated mesa configuration. While these examples indicate how the electrochemical jet etch process for a moated mesa can be applied, these devices offer inventive advantages, regardless of the means by which a moated mesa is obtained.

Figure 3:
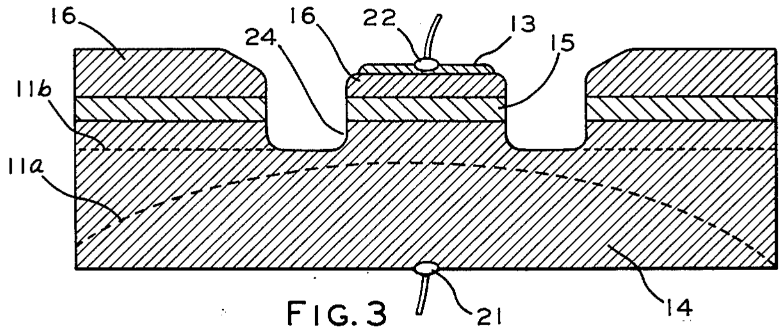
FIGURE 3 is a cross-sectional view of a pnpn diode of improved construction according to this invention.

FIGURE 2 is a cross-section through a semiconducting wafer containing three layers. The most inner and most outer layer are of the same type of electrical conductivity with a layer of the opposite type of electrical conductivity sandwiched between them. Such a structure can be obtained readily by starting with a wafer of a homogeneously doped crystal, say, n-type, due to doping with antimony; then, exposing this crystal to indium at elevated temperatures to indiffuse indium and to create the layer 15 of FIGURE 2. A typical condition for the indiffusion of indium is a germanium temperature of 850° C., and a duration of 2 hours during which the germanium is exposed to the vapor pressure of the indium kept at 400° C. Subsequently, the wafer is exposed to a phosphorus atmosphere at a germanium temperatuer of 750° C. for a period of 10 minutes, the phosphorus being at a temperature of 350° C. This creates the layer 16 by indiffusion of phosphorus. Referring now to FIGURE 3, the wafer shown in FIGURE 2 is subjected to a jet etch, as described previously, causing a moat 24 which cuts through the two pn junctions between layers 14 and 15, and 15 and 16, respectively. However, the duration of the jet etch should be short enough as to leave the top of the mesa in the layer 16. In order to obtain a npnp diode from this configuration, a layer 13 of indium or an indium alloy is plated on top of the mesa and micro-alloyed whereby a pn junction is created between the layers 13 and 16. Ohmic contacts 22 and 21 are then soldered to the layers 13 and 14. To improve the electrical properties of the npnp diode so obtained, it is important to decrease the electrical resistance between the ohmic contact 21 and the pn junction between the layers 14 and 15. In order to decrease this electrical resistance, it is advisable to shape the germanium wafer in such a way as to approach the junction between 14 and 15 by the surface to which the contact 21 is made. This can be achieved readily by an ordinary jet etch procedure such as used in the preparation of the so-called surface barrier transistor. The resulting surface is indicated by the dotted line 11*a* in the FIGURE 3. It is now evident why the moated mesa configuration is superior to the ordinary mesa, for which the dotted line 11*b* would represent the surface. The advantages of the moated mesa arise from mechanical strength and heat dissipation. In case of the moated mesa there are only two narrow zones where the germanium wafer is quite thin while in the case of the ordinary mesa, that is line 11*b*, there is a substantial region over which the germanium wafer is quite thin. Referring now to heat dissipation, the electrical power dissipated between the contacts 21 and 22 is transformed into heat, part of which flows from the mesa region into the body of the semiconductor. The heat flow is assisted by the thicker germanium wafer of this device which has only a narrow web region under the moat in contrast to a germanium wafer having a thickness throughout its width comparable to the area under the moat of this device.

Figure 4:
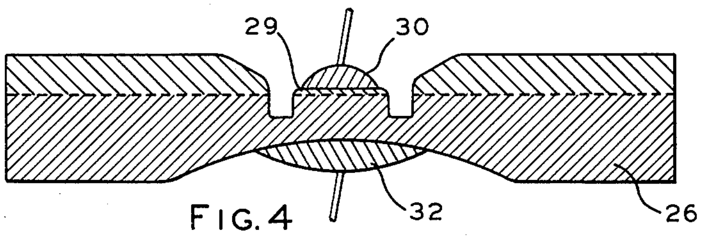
FIGURE 4 is a cross-sectional view of another semiconducting device utilizing a moated mesa configuration.
Figure 5:
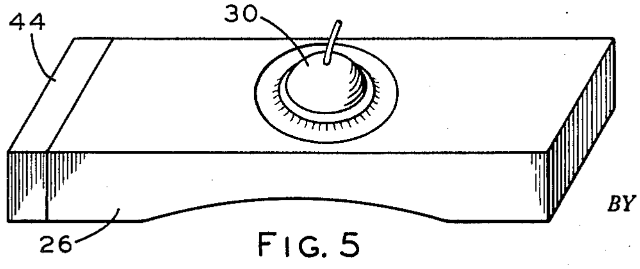
FIGURE 5 is a modified view of a transistor configuration as shown in cross-section in FIGURE 4.

Referring to FIGURE 4, a moated mesa structure is shown again in another semiconductor device. The structure of FIGURE 4 differs from that of FIGURE 3 in that only one pn junction need be made in the germanium wafer instead of the two pn junctions described previously in FIGURE 2. The rectifying contact 32 positioned in the narrow web region in FIGURE 4 replaces the ohmic contact, 21, in FIGURE 3. Thus FIGURE 4 shows again a p-n-p-n structure, the three pn junctions of the npnp configuration are between the layers 30 and 29, 29 and 26, and 26 and 32. The term rectifying contact includes a surface barrier contact such as plated indium to n-type germanium and a micro-alloyed contact such as plated indium with subsequent heat treatment to obtain a melted germanium-indium alloy which is then recrystallized. FIGURE 5 shows another view of the structure of FIGURE 4 with an electrical contact 44 added, to complete a three terminal transistor structure.

This invention has numerous applications to the art of making and using semiconductive structures. In the method of producing the mesa-type structure in a semiconductive device, this invention provides a procedure eliminating the need of masking the surface of the original body and, thus, avoiding the potential danger of surface contamination from masking with an organic substance. Further, the cumbersome procedure of masking is eliminated. Another advantage of the method is the precision with which the area of the outermost conductivity-type layer may be limited. Further, it is seen that, by this method, the mesa-shaped structure can be formed as part of a procedure involving other well-known production steps. This means that the mesa-type structure can be incorporated in otherwise standard electrochemical transistors. The resulting devices are unusual with unexpected advantages. For example, suitable pnpn and npnp junction configurations can be made up as indicated in the above description.

In the above description, embodiments of the invention have been set forth for the purpose of illustrating the invention. Modifications and variations of these preferred methods and devices will be readily apparent to those skilled in the art. Such modifications of the invention may be made without departing from the spirit of this invention as disclosed herein; and, for that reason, it is intended that the invention be limited only by the scope of the appended claims.

What is claimed is:

1. A method for producing a mesa-type structure in a semiconductor including the steps of impinging a jet of electrolyte on a surface of semiconductive material, polarizing said jet negatively with respect to said semiconductive material at said surface, removing material from said semiconductive material by so proportioning the current density and the flow rate of said jet that the etching rate of semiconductivity material is substantially less at the axis of said jet than at the periphery of said jet thereby producing a stagnant pool of said electrolyte at said axis of said jet whereby a mesa is cut out of said semiconductive material and a moat is formed around said cut-out mesa to isolate said mesa from the remainder of said surface.

2. A method for producing a moated mesa in a semiconducting body, said method including the steps of impinging a substantially 10 mil jet of electrolyte consisting essentially of sulfuric acid and sodium fluoride in water onto a surface of semiconductive material of one ohm centimeter resistivity at a rate of approximately 30 millimeters per minute, establishing a current flow of about 30 milliamps between the jet and the semiconductor with the semiconductor positive, and maintaining the conditions for approximately two seconds, whereby an annular moat will be etched in the semiconductor body with a mesa rising within the annulus.

References Cited in the file of this patent

UNITED STATES PATENTS

| | | |
|---|---|---|
| 2,629,800 | Pearson | Feb. 24, 1953 |
| 2,748,041 | Leverenz | May 29, 1956 |
| 2,794,846 | Fuller | July 4, 1957 |
| 2,842,668 | Rutz | July 8, 1958 |
| 2,846,346 | Bradley | Aug. 5, 1958 |

FOREIGN PATENTS

| | | |
|---|---|---|
| 739,294 | Great Britain | Oct. 26, 1955 |